US006994826B1

(12) United States Patent
Hasselbrink, Jr. et al.

(10) Patent No.: US 6,994,826 B1
(45) Date of Patent: Feb. 7, 2006

(54) METHOD AND APPARATUS FOR CONTROLLING CROSS CONTAMINATION OF MICROFLUID CHANNELS

(75) Inventors: Ernest F. Hasselbrink, Jr., Walnut Creek, CA (US); Jason E. Rehm, Alameda, CA (US); Phillip H. Paul, Livermore, CA (US); Don W. Arnold, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 931 days.

(21) Appl. No.: 09/669,862

(22) Filed: Sep. 26, 2000

(51) Int. Cl.
*B01L 3/02* (2006.01)
*G01N 27/447* (2006.01)
*G01N 27/453* (2006.01)

(52) U.S. Cl. ....................... 422/100; 204/451; 204/601

(58) Field of Classification Search ........ 204/451–455, 204/601–605; 422/99, 100
See application file for complete search history.

(56) References Cited

U.S. PATENT DOCUMENTS 5,833,826 A 11/1998 Nordman .................... 204/452
5,842,787 A 12/1998 Kopf-Sill et al. ........... 366/340
5,858,187 A 1/1999 Ramsey et al. ............. 204/452
5,858,195 A 1/1999 Ramsey ....................... 204/601
5,885,470 A 3/1999 Parce et al. .................... 216/33
6,001,229 A 12/1999 Ramsey ....................... 204/451
6,033,546 A 3/2000 Ramsey ....................... 204/603
6,090,251 A * 7/2000 Sundberg et al. ........... 204/453
6,149,787 A * 11/2000 Chow et al. ................ 204/451
6,270,641 B1 * 8/2001 Griffiths et al. ............. 204/451
6,368,871 B1 * 4/2002 Christel et al. ............. 436/180
6,540,896 B1 * 4/2003 Manz et al. ................ 204/451

* cited by examiner

*Primary Examiner*—Alex Noguerola
(74) *Attorney, Agent, or Firm*—Donald A. Nissen

(57) ABSTRACT

A method for controlling fluid flow at junctions in microchannel systems. Control of fluid flow is accomplished generally by providing increased resistance to electric-field and pressure-driven flow in the form of regions of reduced effective cross-sectional area within the microchannels and proximate a channel junction. By controlling these flows in the region of a microchannel junction it is possible to eliminate sample dispersion and cross contamination and inject well-defined volumes of fluid from one channel to another.

7 Claims, 5 Drawing Sheets

METHOD AND APPARATUS FOR CONTROLLING CROSS CONTAMINATION OF MICROFLUID CHANNELS

STATEMENT OF GOVERNMENT INTEREST

This invention was made with Government support under contract no. DE-AC04-94AL85000 awarded by the U.S. Department of Energy to Sandia Corporation. The Government has certain rights in the invention.

CROSS-REFERENCE TO RELATED APPLICATIONS

Not applicable.

BACKGROUND OF THE INVENTION

This invention pertains to a method for injecting well-defined volumes of fluid from one channel into another at their junction in microscale devices to control cross contamination of the channels of microfluidic devices. Fluid control is accomplished generally by providing increased resistance to electric-field and pressure-driven flow in the form of a region of reduced effective cross-sectional area within the microchannels. The invention further relates to microscale devices employing these methods.

Microchannel devices are finding increasing application for separation, identification, and synthesis of a wide range of chemical and biological materials. These devices, whose channel dimensions typically range from a few microns to about one millimeter, permit miniaturization and integration of chemical and biological processes in a manner analogous to that already achieved in microelectronics. Applications for these microchannel devices include DNA sequencing, immunochromatography, analysis and identification of explosives, chemical and biological warfare agents, and synthesis of chemicals and drugs.

Microfluidic devices typically consist of two or more grooves, or microchannels, and chambers etched or molded in a substrate that can be silicon, plastic, quartz, glass, or plastic. The size, shape and complexity of these microchannels, their interconnections, and interactions influence the limits functionality and capabilities of a microsystem. In turn, the size, shape and complexity of microchannels and structures that can be used in microfluidic systems depend on the materials used and the fabrication processes available for those materials. Typical system fabrication includes making trenches in a conducting material (silicon) or in a non-conducting substrate (e.g., glass or plastic) and converting them to channels by bonding a cover plate to the substrate. The typical overall channel sizes range from about 5–100 $\mu$m wide and 5–100 $\mu$m deep.

Despite the substantial promise of these microscale systems, there have been significant drawbacks experienced in their application typically involving reduction in resolution over comparable benchscale methods. One problem that has been recognized involves sample dispersion associated with variation in fluid speed associated with fluid moving along curves or turns in the microchannel flow system. This dispersive effect arises because the fluid moving along the outer radius of a turn must travel further than that moving along the inner radius causing an otherwise flat interface or species band to be skewed. This effect is particularly pronounced in the presence of an electric field gradient, such as would be encountered during electroosmotic flow, which is greater along the shorter inner radius resulting in greater fluid speed along the shorter inner radius path.

As summarized in U.S. patent application Ser. No. 09/299,269 filed Apr. 26, 1999, entitled "Method and Apparatus for Reducing Sample Dispersion in Turns and Junctions of Microchannel Systems" and assigned to the same assignee, different approaches have been used to minimize the dispersive effect induced by the presence of curves and turns. Nordman (U.S. Pat. No. 5,833,826) utilizes focusing electrodes to obtain a more uniform electric field and hence, a more uniform flow field. However, this solution introduces increased complexity in fabrication and control of the plurality of electrodes and associated circuitry required for systems having a multitude of turns. Kopf-Still (U.S. Pat. No. 5,842,787) seeks to reduce dispersion in turns by means of channel geometries having small aspect ratios, wherein the channel depths are much greater than their widths. The smaller channel width helps reduce the difference in transit time along the inner and outer walls of a turn, thereby reducing dispersion. Dispersion can also be reduced by fabricating turns having a depth along the inner radius that is greater than that along the outer radius. This approach to reducing turn-induced dispersion would substantially increase costs since most conventional lithographic processes are designed to produce channels having a uniform cross-section.

While these approaches provide methods for reducing dispersion in a fluid sample as the fluid sample flows around curves or turns in the microchannel, they fail to address an even more fundamental problem associated with fluid flow in microchannel systems, uncontrolled fluid flow (leakage) during the operation of injecting a sample of fluid across a junction.

Numerous methods can be implemented for the transport of fluid and species (charged or uncharged) in microfluidic channels. These include: electroosmosis, electrophoresis, pressure-driven convection, diffusion, or any combination thereof. When these methods are used (alone or in combination) to inject a sample of fluid across a microfluid junction (for example, two channels intersecting in a cross), uncontrolled fluid flow resulting in significant leakage of excess injected fluid can occur. This leakage impedes the capability to inject the controlled volume of fluid (or mixture of fluids) from one stream into another stream such as would be required for accurate analysis or controlled reactions.

FIGS. 1*a*–1*c* show an example of this leakage using a typical injection device: a cross 100 with the fluid transported by electroosmosis. A dye has been added to the fluid in order to follow the path of fluid flow more easily. The fluid from which a sample is to be extracted flows in horizontal microchannel 110 under the influence of a potential gradient. When a sample is to be taken from the fluid stream, microchannel 110 is left electrically floating and a potential gradient is applied to vertical microchannel 120 for a brief period of time, in order to inject a small sample of the fluid into microchannel 120. As indicated by the pattern of trailing dye (FIGS. 1*b* and 1*c*) fluid continues to flow (leak) into microchannel 120 after the potential gradient has ceased to be applied. Electroosmotic-driven fluid flow is a 'potential flow' which means that fluid flow follows the paths traced by the streamlines of the electric field. Leakage occurs in this injection scheme because fluid streamlines, which correspond to electric field lines in electroosmotic-driven flow, enter the electrically floating channel. This phenomenon is graphically illustrated in FIG. 2 which shows the electric field lines at the intersection between channel 110 having an electric field contained therein and one that is floating 120.

It can be seen that the electric field lines intrude a significant distance into the floating channel. This intrusion of electric field lines into the electrically floating channel not only explains the "leakage" shown in FIGS. 1*b* and 1*c* but also explains why the sample fluid is observed to enter microchannel 120 prior to application of a potential gradient to that microchannel (FIG. 1*a*).

The problem of leakage in injection devices has been recognized and means for mitigating this problem have been proposed. Ramsey in U.S. Pat. No. 5,858,195 and Published PCT Application No. WO96/04547 and Parce in U.S. Pat. No. 5,885,470 employed a scheme called "controlled electrokinetic material transport", to control cross-channel leakage in microchannel systems and particularly in arrangements of integrated microchannels. In this scheme separate electric potentials are applied across the various microchannels. However, these methods require careful control of multiple electrical power sources as well as a priori knowledge of the conductive properties of all fluids in all channels to determine the required voltages. Furthermore the method is susceptible to disruption due to variations in fluid compositions, hydrostatic pressure-driven interferences, and diffusion effects, all of which may degrade the quality or purity of the injected sample.

SUMMARY OF THE INVENTION

Accordingly, the present invention generally provides method and apparatus for reducing or substantially eliminating channel cross-contamination, due to electric field streamlines entering the floating channel, hydrostatic pressure effects, and mass diffusion, during microfluidic sample injections. Moreover, the successful application of the invention requires neither prior knowledge of the conductive properties of all fluids nor is the method is susceptible to disruption due to variations in fluid compositions, hydrostatic pressure-driven interferences, and diffusion effects. The apparatus generally incorporate a reduction of the cross-sectional area of channels in proximity to the intersection. In this way the deleterious dispersive effects of electric field leakage, diffusion, and any pressure gradients that might be present in the system during sample introduction and injection, are substantially eliminated. A non-orthogonal intersection microchannel geometry can also be used in conjunction with reduction in cross-sectional area to reduce the leakage of electric field lines away from the intersection during sample injection. The method for eliminating electric field induced dispersion described herein also provide a number of other benefits for the control of fluid and material in the presence of pressure gradients and mass diffusion. Moreover, in contrast to prior art systems, the present devices eliminate the need for extraneous control voltages or pressures.

BRIEF DESCRIPTION OF THE DRAWINGS

The accompanying drawings, which are incorporated in and form part of the specification, illustrate the present invention and, together with the description, explain the invention. In the drawings like elements are referred to by like numbers.

DETAILED DESCRIPTION OF THE INVENTION

The present invention provides improved performance in microfluidic devices by significantly reducing or substantially eliminating sample dispersion effects and cross-contamination between channels. A region of reduced cross-section within a microchannel, that can be proximate the channel junctions, is employed to control the electric-field and pressure-driven fluid flows responsible for degraded performance.

Figure 3:
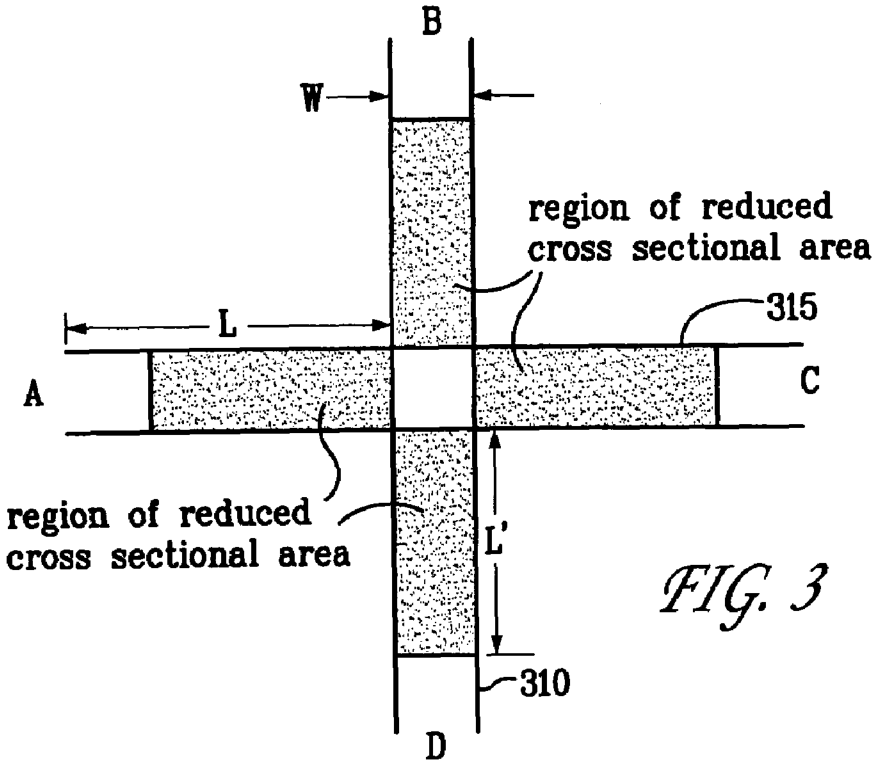
FIG. 3 shows an embodiment of the invention.

For the purpose illustrating and exemplifying the present invention, consider a standard geometry presently used in the art, as shown in FIG. 3: two microchannels 310 and 315, having widths W and depths D, that intersect at a junction in a right cross. The widths and depths of the microchannels are typically in the range of 0.1 micron to 1 millimeter. The invention is not limited to this geometry and can apply equally to any number of microchannels of any widths and depths or any arbitrary cross-section, either straight or curved, at intersections of any arbitrary angles. It should be noted that throughout the description of the invention the terms "channel" and "microchannel" will be used synonymously and interchangeably. Further in accordance with the present invention, channel intersections can exist in a number of configurations including right cross intersections, "T" intersections, "Y" intersections, double "Y" intersections, or any number of other possible configurations in which any two channels are in fluid communication. The term "effective cross-sectional area" represents that channel area that produces an increase in resistance to either electric-field or pressure-driven flow and can be equal to the geometric cross-sectional area. The invention also applies to cases where the ends of the channels are at junctions between other channels. Reservoirs for facilitating fluid or material introduction into the channels can be incorporated into the microchannel structure. In addition to providing means for introduction of fluids, reservoirs can provide entry to the microchannels where electrodes can be placed into contact with fluids within the device, allowing application of electric fields along the channels to control and direct fluid transport. An electric potential can be applied across some length of the microchannels by any method, including: (1) electrodes placed within the channels, (2) electrodes within fluid reservoirs at some point along or at the ends of the channels, or (3) through salt bridges (defined herein as devices which allow the flow of ionic current but greatly restrict fluid transport) connected to the channels or reservoirs.

While the structure and function of the invention will be described and illustrated in relation to the microchannels and arrangements thereof it is understood that the microchannels themselves are part of a microfluidic device that typically comprises an aggregation of two or more separate layers mated or joined together. Typically, these layers comprise a top portion that can have holes or ports to provide access to the channels and reservoirs, and a bottom portion, upon which the bottom portion is fabricated to define the channels and reservoirs of the device.

Figure 8:
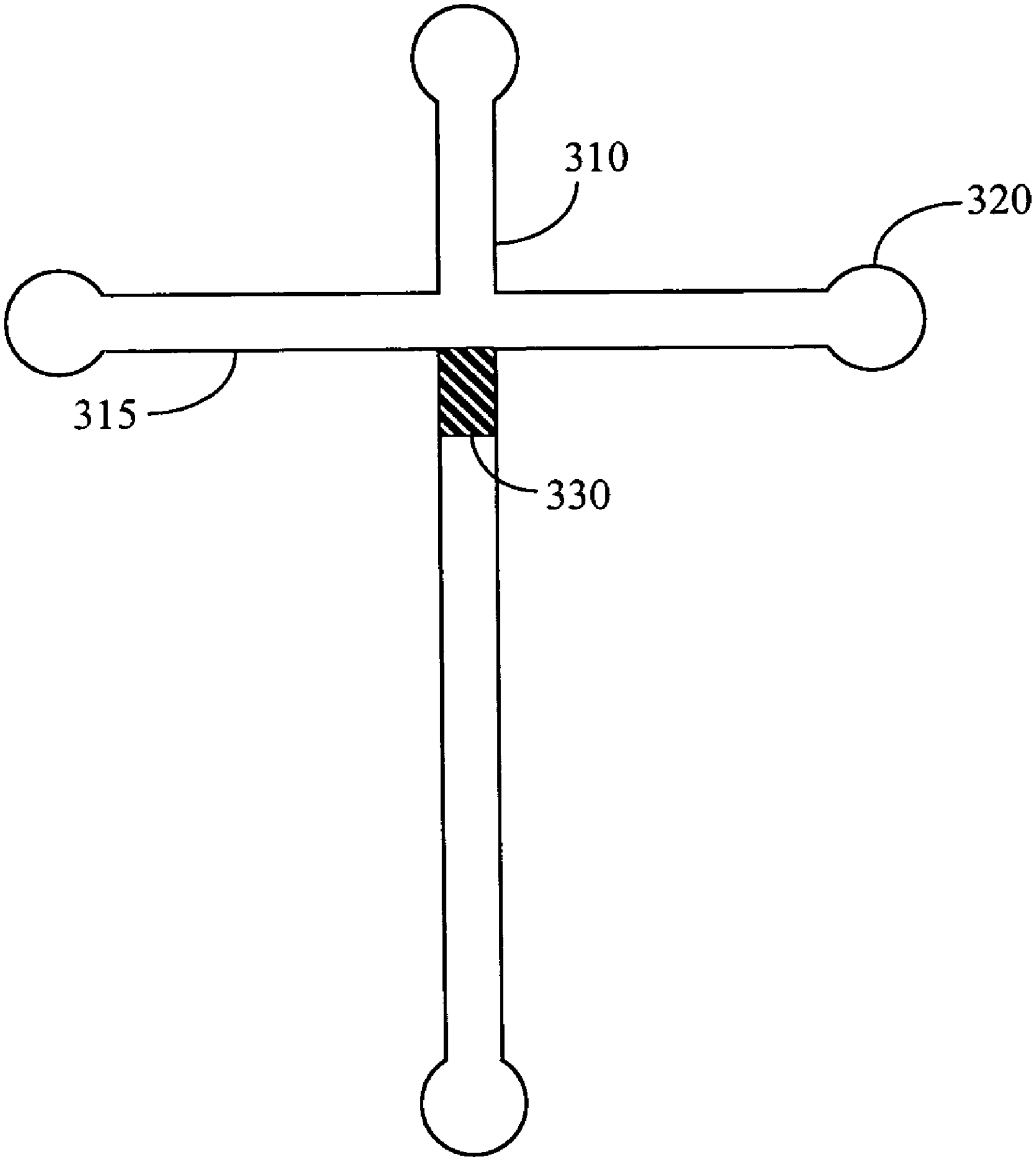
FIG. 8 shows a microchannel system.

Referring again to FIG. 3, a section of each of microchannels 310 and 315 of length L, proximate the junction, has a Region of Reduced Effective Cross-sectional Area (hereinafter called a RORECA) as indicated by the shaded region produced by reducing the internal dimensions of the channel. As illustrated in FIG. 8, reduction in effective cross-sectional area can be produced by filling one of more channels with a material 330, such as a porous material, or or structured particles (porous or nonporous) fabricated by art recognized methods such as, lithographic patterning and etching to create arrays of structures in the microchannel or channels of varying dimension, by lithographic patterning and subsequent etching to create channels and then subsequent lithographic patterning and material deposition or regrowth to partially refill the channels, direct injection molding, in-situ polymerization, sol-gel processes, high energy lithography combined with electroforming and molding (LIGA), and hot or cold embossing. The depth (D) and width (W) of the intersection or junction is nominally, but not necessarily, the same as that of the channels away from the RORECA. Although in this example all intersecting channels are shown with a RORECA, it is not always necessary that all channels have a RORECA. Also, we note that the entire channel can be considered a RORECA if the effective area of the channel is less than the cross-sectional area of the intersection. The important point is that the area of the junction or intersection is larger than the reduced effective area of the intersecting channels at that junction. By narrowing only the area of the channel(s) in proximity to the intersection, the RORECA design has the additional advantage that the total resistance of the channel is only slightly affected, i.e., the total fluid flowrate through the channel is substantially the same as in a channel without RORECA.

Figure 4:
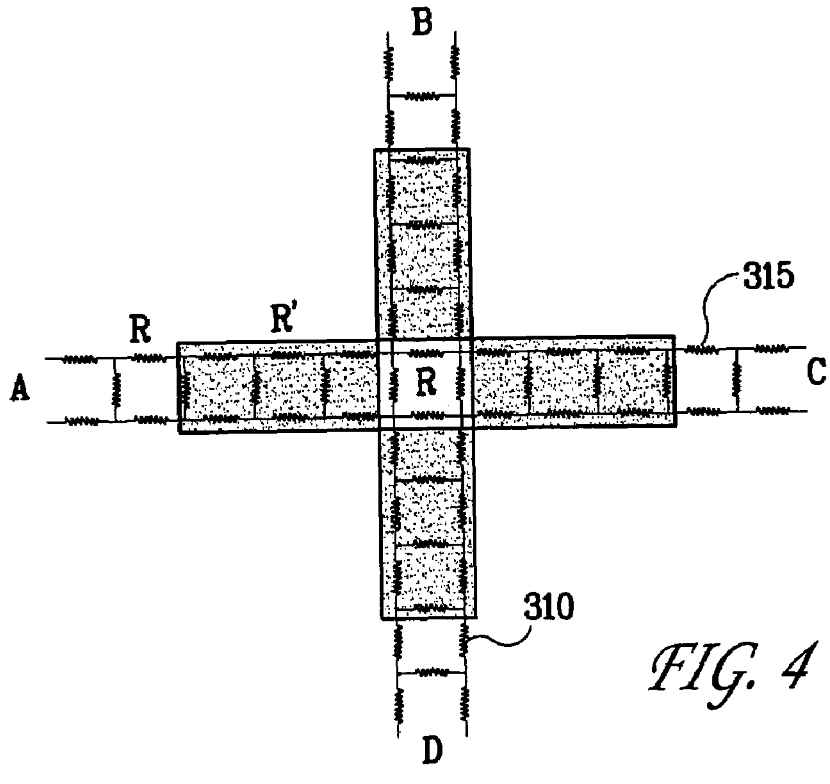
FIG. 4 shows a resistor network model of a right cross junction.

When considering a fluid transported by the action of an electric field, such as by electroosmosis, the effect of providing a microchannel with a region of reduced cross section is to increase the apparent electrical resistance of that region of the microchannel. The resistance of the above-described 110 intersection illustrated in FIG. 3 can be modeled by a network of resistors as shown in FIG. 4. Here, the junction is composed of elements of resistance R and the intersecting channels have a resistance R' in the region of reduced cross-sectional area (shaded area) and resistance R in the normal channel. The resistance of a fluid element is equal to its length divided by the product of fluid conductivity and cross-sectional area of the channel (divided by two for the sections represented by resistors in parallel). If an electric potential is applied along channel 315 (from point A to point C) and channel 310 (from points B and D) is unpowered (floated), the current in channel 310 must be a small fraction of the value in channel 315 in order to reduce unwanted fluid flow into the unpowered channel (310). Calculations of the electric field based on the resistor model shown in FIG. 3, show that the electric field in the unpowered channel (310) drops to about 4% of the field in channel 315 when L equals one channel width. The electric field drops to about 0.2% of the powered channel when L=2W, and drops to about 0.03% when L=3W. Hence nearly all the benefit is obtained in the first 3–4 channel widths; in fact, about 96% of the benefit is obtained in the first width! Note that the magnitude of the benefit, however, is largely governed by the area ratio.

The reduction in effective cross-sectional area in regions surrounding the junction in this example has three advantages: 1) fluid leakage from the channels having an imposed electric field into the floating (having no or a very small imposed electric field) channels (such as that illustrated in FIG. 1) is significantly reduced or eliminated, thereby eliminating cross-contamination of channels by electric field-induced convection; 2) the reduction of interfacial area reduces mass diffusion into and out of the junction from the surrounding channels, thereby reducing cross-contamination of fluid in the channels by mass diffusion; 3) the area reduction reduces any flow through/into/out of the junction due to pressure gradient-driven flows, which can be generated by external or internal pressure sources. These advantages are accomplished without any additional power sources to bias the junction voltage and the performance of the device is generally unaffected by variations in fluid properties (i.e. changes in pH, conductivity, or fluid species composition).

Figure 5:
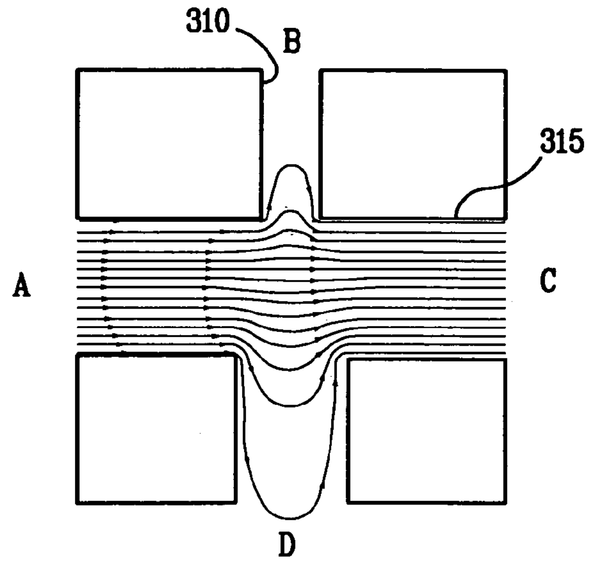
FIG. 5 shows electric field lines where one segment of a channel in a right cross junction has a region of reduced cross-sectional area.

To further illustrate the modification of the flow field in the junction of two intersecting channels due to RORECA, the electric potential field (the electroosmotic generated flow field) in a variety of microchannel intersection geometries can be computed by numerical analysis. For intersecting channels in a right cross geometry, consider the case of equal channel depth and cross sectional areas throughout the channel lengths. Fluid flow streamlines computed for this case are shown in FIG. 2. Here, a voltage is applied to channel 315 and channel 310 is left floating. Clearly, fluid flow from channel 315 penetrates far (over a channel width) into channel 310, thus cross-contaminating the fluids of both channels, as discussed above and shown in FIG. 1*a*. Using the method described herein to modify the electric potential field at the junction between the two channels, i.e., reducing the effective cross sectional area in the region of the junction, leakage, unwanted flow of fluid from one channel to another, can be substantially eliminated. If, for example, the cross sectional area of one section (B) of channel 310 is made smaller by a factor of two the flow streamlines are modified in a way illustrated by FIG. 5. Decreasing the cross-sectional area by only a factor of two significantly inhibits fluid flow into unpowered channel 310 due to the increase in channel resistance. Similar results can be shown for cases where the effective cross-section area in the unpowered channels is reduced by the insertion of porous material, packing with particles, posts, columns, or some other geometry in such a way so as to reduce the effective cross sectional area of the channel. Although the examples above were for cases where a single channel had regions of reduced cross sectional area, this invention applies equally to cases where a plurality of channels have regions of reduced cross-sectional area. For cases where the powered channels have a RORECA, the electroosmotic flowrate through the powered channel is unaffected by the presence of the area change within the channel.

Figure 1A:
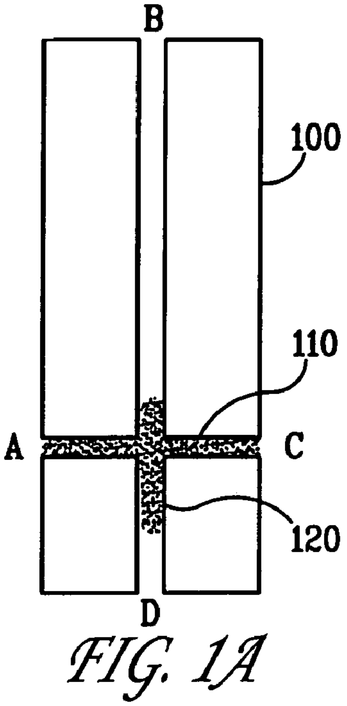
FIGS. 1*a*–1*c* show sequential images of an injection at a right cross junction.
Figure 1B:
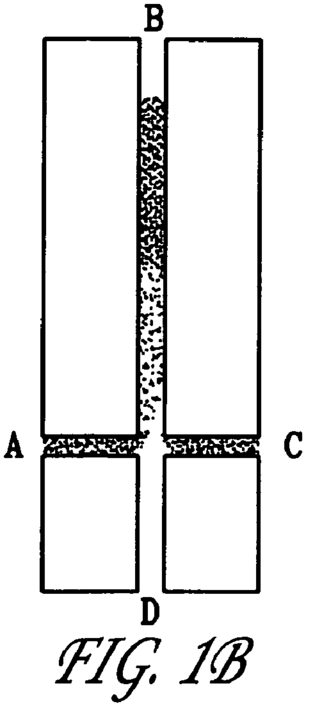
Figure 1C:
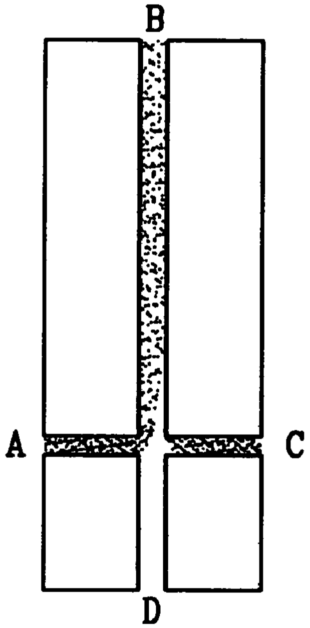
Figure 2:
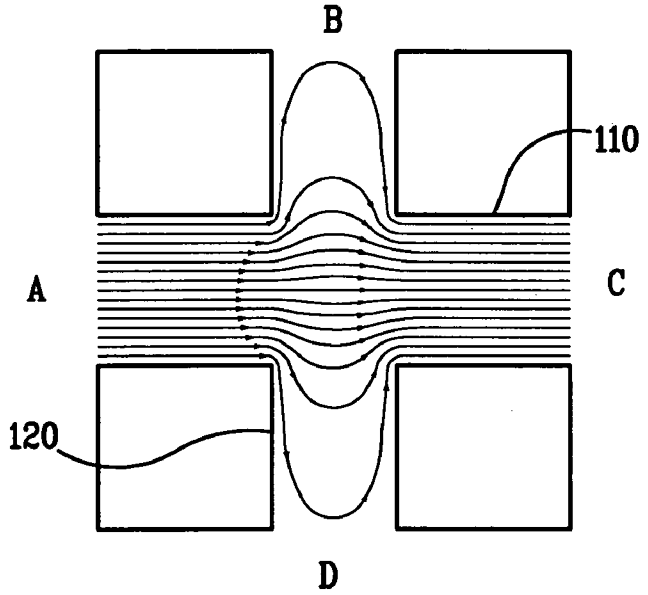
FIG. 2 shows distribution of electric field lines at a right cross junction having channels with equal cross-sectional areas.
Figures 6A, 6B, 6C:
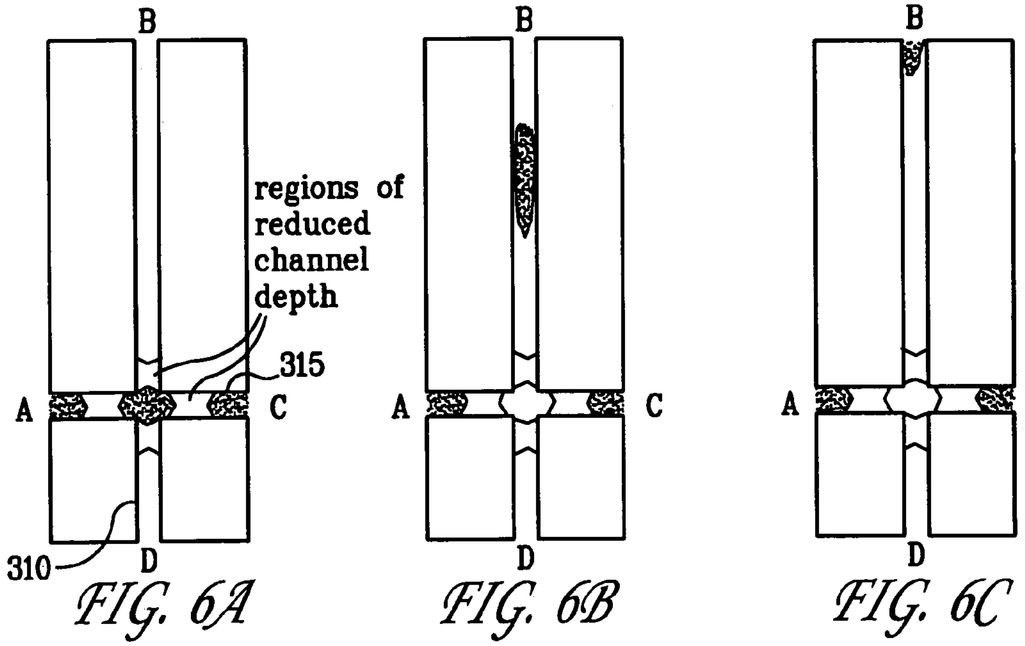
FIGS. 6*a*–6*c* shows sequential images of an injection at the junction of FIG. 5

FIGS. 1*a*–1*c* demonstrated the dispersion and leakage of an injection using a single power source in a microchannel of uniform cross-sectional area. FIGS. 6*a*–6*c* show the reduction in leakage of injected fluid provided by the present invention. Both channels have a RORECA proximate the junction. Applying a potential from points A to C in channel 315, a dye-marked fluid is transported by electroosmosis from A to C as shown in FIG. 6*a*. Here, the cross-sectional areas in the regions of reduced area proximate the cross junction are one-tenth the area of the primary channels ($A'=\frac{1}{10}A$). Immediately obvious in the initial image (FIG. 6*a*) is the reduction in leakage from channel 315 to 310. Floating channel 315 and applying a potential from points D to B in channel 310 then injects the plug of dye-marked fluid into section B (FIG. 6*b*) by electroosmosis. However, the sample flowing towards B is now well defined and retains the desired 'plug' shape with reduced cross-contamination and leakage between channels, even at much later times (FIG. 6*c*).

Figure 7A:
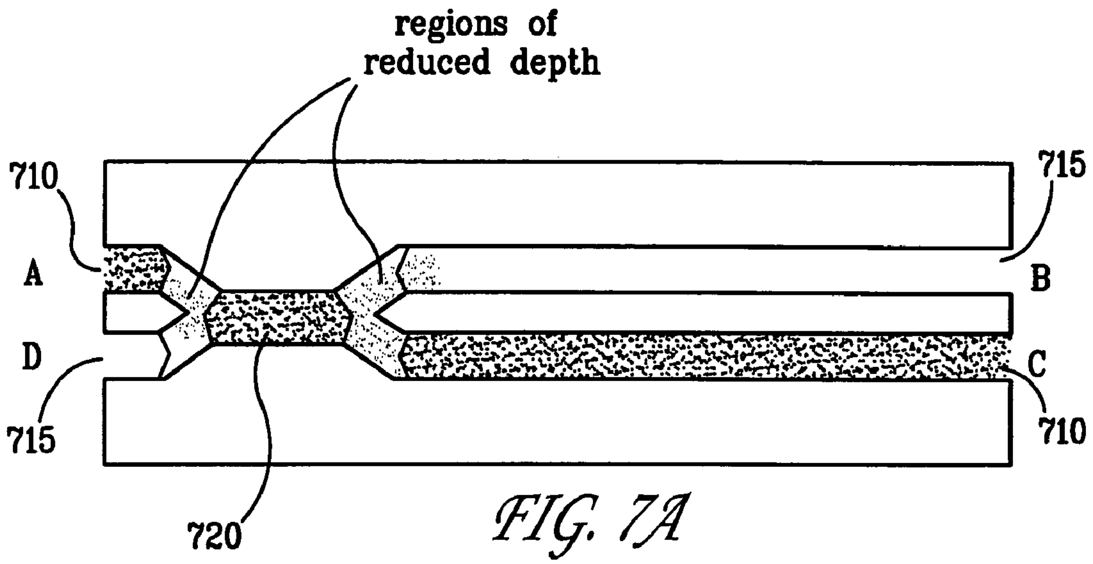
FIGS. 7*a* and 7*b* show sequential images of the injection of a double "Y" junction having regions of reduced cross-sectional area proximate the junction.
Figure 7B:
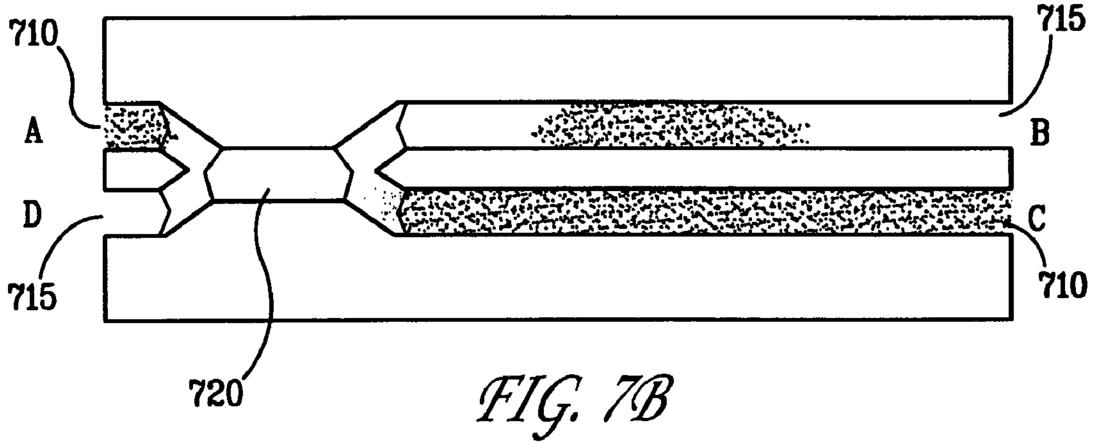

Modifying the channel intersection geometry in conjunction with reducing the area of the channels proximate their junction can also provide marked improvement in sample dispersion. It will be appreciated by those skilled in the art, that it is preferred that the streamlines in the junction effectively sweep out the entire sample volume, without large differences in the times required to traverse the intersection. The inventors have shown that this can be accomplished by means of a non-orthogonal intersection geometry. By way of example, intersecting channels, each in the form of a 'Y', wherein the included angle between the branches of the "Y" is less than ninety degrees is illustrated in FIG. 7*a*. Further, each of the intersecting channels of the "Y" has a reduction in channel area proximate the channel junction. In this example, the regions of reduced cross-sectional area are created by reducing the channel area by a factor of ten ($A'=\frac{1}{10}A$). In FIG. 7*a*, the sample fluid (dye-marked fluid) is transported along channel 710 by applying an electric potential to channel 710 (A to C), thereby filling junction 720 with sample fluid. Channel 715 is unpowered, i.e., floats. The sample is then injected as a plug into the B segment of channel 715 by floating channel 710 (A to C) and applying a potential to channel 715 (D to B) (FIG. 7*b*). The sample is transported as a well-defined plug and leakage from adjoining columns is significantly reduced as compared to injections performed in similar channels without the methods and devices described herein.

In the examples above, the method of the invention was illustrated by reduction of the effective cross-sectional area proximate a cross junction. However, it is contemplated that the region of area reduction can also include multiple regions in a single channel, single regions of multiple channels, or multiple regions of multiple channels. Any number of methods, as set forth above, can accomplish the desired area reduction.

In another aspect of the present invention, the use of RORECA selectively placed in microchannels can also be used to restrict pressure-driven flow to minimize pressure gradient effects so that fluid can be transported by pressure-driven flow through intersecting channels or a series of intersecting channels with minimal cross-contamination.

In this aspect of the invention, consider a right cross channel geometry. Only one channel contains a RORECA and the second channel has uniform cross-sectional area throughout. A pressure applied to the end of the channel having a uniform and unreduced cross-sectional area will cause fluid transport primarily through this channel since fluid flowrate is proportional to the cross sectional area of the channel. Thus, the reduction in cross-sectional area alone will reduce the pressure-driven flowrate into the channel having a reduced cross-sectional area. In addition, reduction of the cross-sectional area has the additional effect of increasing the pressure head losses in the channel having reduced flow further reducing the flow into that channel. In like manner, reducing the effective cross-sectional area of a channel(s) will also reduce cross-contamination due to hydrostatic pressure gradients such as those caused by uneven fluid height in channel reservoirs or effects of height variations in channels.

In a further aspect of the invention, RORECA can be used to provide for the reduction of mass transport by diffusion. Mass flux due to a concentration gradient (which exists axially through a channel) is proportional to the cross-sectional area of the channel, and the total flux increases with time. The presence of an area of reduced cross-section in a channel reduces the total mass flux to that channel by the ratio of the reduced area cross-section to that of the unmodified channel. Hence the method of the invention, reduced effective cross-sectional area, is especially useful to bound regions where fluids must be held stationary (or only slowly moving), but diffusive transport into or out of the region is undesirable. Examples include reactors (especially where slow reactions mandate long residence times), mixers, manifolds, and reservoirs.

In summary, by providing regions of reduced effective cross-sectional area within at least one channel the method of the present invention can be used to eliminate sample dispersion and channel cross-contamination due to stray electric field lines, hydrostatic pressure effects, and mass diffusion at the junction of two or more channels within an arrangement of intersecting channels or within a single channel.

The foregoing is intended to be illustrative of the present invention and is provided for purposes of clarity and understanding of the principles of this invention. Many other embodiments and modifications can be made by those of skill in the art without departing from the spirit and scope of the invention as defined in the following claims.

What is claimed is:

1. A microfluidic device for reducing sample dispersion and cross-contamination, comprising:

a microchannel system disposed on a substrate, the microchannel system comprising at least two microchannels joined together to form a junction at their intersection, wherein at least one of the microchannels has a reduced effective cross-sectional area proximate the junction that is less than the cross-sectional area of the junction, and wherein the reduced effective cross-sectional area extends from the junction into the microchannel a distance of from about 0.5 to 4 microchannel widths, and wherein the reduced effective cross-sectional area comprises a porous material, posts, or columns disposed in the microchannel.

2. The device of claim 1, wherein the microchannels are disposed in an orthogonal relationship.

3. A device for eliminating sample dispersion at microchannel junctions, comprising:

a first and a second branching junction, wherein each branching junction has one inlet channel and two outlet channels and wherein the inlet channels of said first and second branching junctions are joined together to form a junction and wherein each of the outlet channels is provided with a region of reduced effective cross-sectional area proximate the junction, and wherein the region of reduced effective cross-sectional area extends from the junction into the microchannel a distance of from about 0.5 to 4 microchannel widths, and wherein the reduced effective cross-sectional area comprises a porous material, posts, or columns disposed in the microchannel.

4. The device of claim 3, wherein the reduced effective cross-sectional area comprises a porous material disposed in the microchannel.

5. The device of claim 3, wherein the reduced effective cross-sectional area is about 10% that of the cross-sectional area of the microchannel.

6. A method for controlling sample dispersion and cross contamination of microchannels, comprising:

providing a microchannel system, the microchannel system comprising;

a substrate having at least two microchannels disposed thereon, wherein the microchannels intersect to form at least one junction; and modifying at least one microchannel to produce at least one region of reduced effective cross-sectional area proximate the junction, wherein the region of reduced effective cross-sectional area extends from the junction into the microchannel a distance of from about 0.5 to 4 microchannel widths, and wherein the step of modifying includes reducing the geometric cross-sectional area with posts or columns, filling the microchannel with a porous material, or packing the microchannel with structured particles.

7. A method for reducing mass transport by diffusion, comprising:

providing at least two spaced apart regions of reduced effective cross-sectional area within a microchannel, wherein the regions of reduced cross-sectional area are about 0.5 to 4 microchannel widths long, and wherein the reduced effective cross-sectional area comprises a porous material, posts, or columns disposed in the microchannel.

* * * * *